Nov. 5, 1957 A. J. W. M. VAN OVERBEEK 2,812,436

TRANSISTOR-OSCILLATOR CIRCUIT

Filed Feb. 5, 1954

INVENTOR
ADRIANUS JOHANNES WILHELMUS
MARIE VAN OVERBEEK

BY [signature]

AGENT 2,812,436

TRANSISTOR-OSCILLATOR CIRCUIT

Adrianus Johannes Wilhelmus Marie van Overbeek, Eindhoven, Netherlands, assignor, by mesne assignments, to North American Philips Company, Inc., New York, N. Y., a corporation of Delaware Application February 5, 1954, Serial No. 408,534

Claims priority, application Netherlands February 6, 1953

6 Claims. (Cl. 250—36)

The present invention relates to a circuit arrangement for producing electrical oscillations. More particularly, the invention relates to a circuit for producing electrical oscillations, comprising a transistor, a capacitative impedance and an inductive impedance. It has for its object more particularly to provide an oscillator circuit having a high oscillator frequency exceeding the limit frequency of the transistor. The term "limit frequency," or cut-off frequency, is to be understood to mean herein the frequency at which the magnitude of the current amplifying factor $\alpha$ of the transistor drops 3 db from its low frequency value.

In accordance with the invention, the transistor oscillates above its limit frequency, since the capacitative impedance is connected between the emitter electrode and the collector electrode and the inductive impedance is connected between the collector electrode and the base electrode. These two impedances, viewed from the collector electrode, together constitute a parallel resonant circuit tuned approximately to the oscillator frequency.

In order that the invention may be readily carried into effect, it will now be described with reference to the accompanying drawing, wherein.

Figure 1:
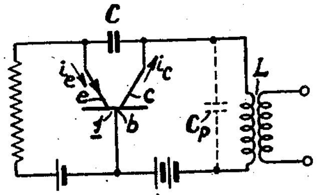
Fig. 1 is a schematic diagram of an embodiment of the circuit arrangement of the present invention.

Referring to Fig. 1, the oscillator circuit comprises a transistor 1, more particularly a point-contact transistor, having an emitter electrode *e*, a collector electrode *c*, and a base electrode *b* and moreover, a capacitor C, connected between the electrodes *e* and *c* and an inductor L, connected between the electrodes *c* and *b*, so that the transistor can oscillate over its limit frequency at an oscillator frequency $f_0$ of about $$\frac{1}{2\pi\sqrt{LC}}$$

Any stray capacity $C_p$, occurring in parallel with the inductor L must be added to the capacitor C. It should be noted here that the inductor L with the capacitor C, to which $C_p$, if any, is added, viewed from the collector electrode *c*, may be considered to be a parallel resonant circuit tuned approximately to the oscillator frequency $f_0$, since the left-hand terminal of the capacitor C and the lower terminal of the inductor L are connected to one another through a substantially negligible impedance, constituted by the internal resistance between the emitter electrode and the base electrode of the transistor 1.

The invention is based on measurements carried out on a transistor, from which it appears that the current amplification factor $\alpha$ not only drops strongly in the proximity of the limit frequency, but also exhibits a great phase shift $\varphi$, which adversely affects the oscillating operation in conventional oscillator circuits, but which, however, is an advantage in the present arrangement.

Figure 4:
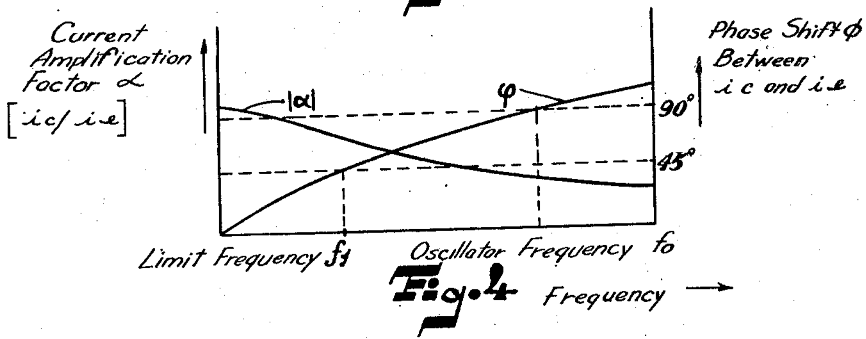
Fig. 4 is a graphical presentation of the current amplification as a function of the frequency.

Fig. 4 shows the current amplification factor (which is defined as the ratio between the collector current $i_c$ and the emitter current $i_e$ with constant collector voltage) as a function of frequency and the phase shift between the collector current $i_c$ and the emitter current $i_e$. At the limit frequency $f_1$, where $|\alpha|$ (the absolute value of $\alpha$) has dropped by about 3 db, a phase shift of about 45° is found. At a frequency $f_0$ equal to two to three times the limit frequency $f_1$, a phase shift of 90° is found.

Since, viewed from the collector electrode *c*, the impedances L and C constitute a parallel resonant circuit tuned approximately to the oscillator frequency, a high voltage of approximately equal phase to the collector current $i_c$ is produced at the collector electrode *c*. The current $i_e$, which thus flows through the capacitor C to the emitter electrode *e* and which exceeds considerably the collector current $i_c$ as it is enhanced by the circuit LC, exhibits, moreover, a considerable phase shift relative to the current $i_c$, for example, precisely 90° at the resonance of the circuit LC. Due to the phase shift $\varphi$ of the current amplification factor $\alpha$ the emitter current $i_e$ thus produced re-supplies the collector current $i_c$ with the initial phase, so that one oscillation condition is fulfilled.

Figure 2:
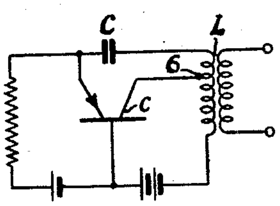
Fig. 2 is a modification of the embodiment of Fig. 1.

In the arrangement shown in Fig. 2, the collector electrode is connected to a tapping point 6 of the inductor L, so that the voltage across the inductor L is enhanced, thereby frequently facilitating the oscillation.

Figure 3:
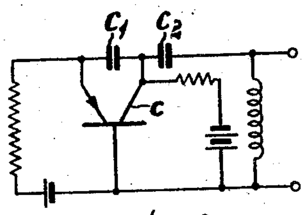
Fig. 3 is another modification of the embodiment of Fig. 1.

Referring to Fig. 3, the capacitor C shown in Fig. 1 is divided into two capacitors $C_1$ and $C_2$, the junction of which is connected to the collector electrode *c*. Otherwise, the operation of the two circuit arrangements is identical with that of the arrangement shown in Fig. 1.

Reference may be made to a numerical example of a transistor in which, in accordance with the conventional equivalent diagram, the internal emitter resistance $r_e$ is 50 ohms, the internal collector resistance $r_c$ is 10 kilohms, the internal base resistance $r_b$ is 200 ohms, $\alpha_0$ is $\alpha$ for low frequencies is 2.5, $f_1$ is 7 megacycles per second, L is 18 microhenries, $C_p$ is 2 micromicrofarads and C is 5 micromicrofarads, $f_0$ is 15 megacycles per second. The circuit LC must have a high circuit quality, in order to ensure a satisfactory frequency stability of the oscillator frequency $f_0$.

While the invention has been described by means of specific examples and in specific embodiments, I do not wish to be limited thereto, for obvious modifications will occur to those skilled in the art without departing from the spirit and scope of the invention.

What is claimed is:

1. A circuit arrangement comprising a transistor having emitter, collector and base electrodes and having a given limit frequency value, said transistor having a stray capacity between said collector and base electrodes, and means for producing electrical oscillations in said circuit arrangement at a frequency greater than said limit frequency, said means comprising a capacitive impedance connected between the emitter and collector electrodes and an inductive impedance connected between said collector and base electrodes, said capacitive impedance including said stray capacity, said impedances as viewed from the collector electrode constituting a parallel resonant circuit, the impedances of said circuit having values at which said parallel resonant circuit is tuned to a frequency above the said limit frequency of the transistor and said capacitor thereby produces a 90 degree phase shift in the current flow between said collector and emitter electrodes.

2. A circuit arrangement for producing an electrical oscillation comprising a transistor having emitter, collector and base electrodes, a given limit frequency value and a stray capacity between said collector and base electrodes, and feedback means intercoupling said electrodes for generating oscillations in said circuit arrangement and comprising a capacitive impedance connected between the emitter and collector electrodes and an inductive impedance connected between said collector and base electrodes, said capacitive impedance including said stray capacity, said impedances forming a parallel resonant circuit, the impedances of said circuit having values at which said parallel resonant circuit is tuned to a frequency above the said limit frequency of the transistor and said capacitor thereby produces a 90 degree phase shift in the current flow between said collector and emitter electrodes.

3. A circuit arrangement as claimed in claim 2, wherein one of said impedances has a tap thereon, said collector electrode being connected to said tap.

4. A circuit arrangement for producing an electrical oscillation comprising a point contact transistor having emitter, collector and base electrodes, a given limit frequency value and a stray capacitiy between said collector and base electrodes, and feedback means intercoupling said electrodes for generating oscillations in said circuit arrangement and comprising a capacitor connected between said collector and emitter electrodes, a transformer having a primary winding and a secondary winding, said primary winding being connected between said collector and base electrodes, means for deriving said electrical oscillation from said secondary winding, a first bias voltage source interposed between said primary winding and said base electrode, a second bias voltage source and a resistor connected in series with said second source, the series combination of said resistor and said second source being connected between said base and emitter electrodes, said capacitor and said stray capacity forming with said primary winding a parallel resonant circuit, the impedances of said circuit having values at which said parallel resonant circuit is tuned to a frequency above the said limit frequency of the transistor and said capacitor thereby produces a 90 degree phase shift in the current flow between said collector and emitter electrodes.

5. A circuit arrangement for producing an electrical oscillation comprising a point contact transistor having emitter, collector and base electrodes, a given limit frequency value and a stray capacity between said collector and base electrodes, a capacitor, a transformer having a primary winding and a secondary winding, said primary winding having a tap thereon and being connected between said base electrode and one terminal of said capacitor, the other terminal of said capacitor being connected to said emitter electrode, said tap being connected to said collector electrode, means for deriving said electrical oscillation from said secondary winding, a first bias voltage source interposed between said primary winding and said base electrode, a resistor, a second bias voltage source connected in series with said resistor, said series connected resistor and second source being connected between said emitter and base electrodes, said capacitor and said stray capacity forming with said primary winding a parallel resonant circuit, the impedances of said circuit having values at which said parallel resonant circuit is tuned to a frequency above the said limit frequency of the transistor and said capacitor thereby produces a 90 degree phase shift in the current flow between said collector and emitter electrodes.

6. A circuit arrangement for producing an electrical oscillation comprising a point contact transistor having emitter, collector and base electrodes, a given limit frequency value and a stray capacity between said collector and base electrodes, a first capacitor connected between said collector and emitter electrodes, a second capacitor, an inductor connected between said electrode and one terminal of said second capacitor, the other terminal of said second capacitor being connected to said collector electrode, means for deriving said electrical oscillation from said inductor, a first bias voltage source and a first resistor connected in series with said source, the series combination of said source and said resistor being connected between the base and collector electrodes, a second bias voltage source and a second resistor connected in series with said second source, the series combination of said second source and second resistor being connected between said emitter and base electrodes, said capacitors and said stray capacity forming with said inductor a parallel resonant circuit, the impedances of said circuit having values at which said parallel resonant circuit is tuned to a frequency above the said limit frequency of the transistor and said capacitor thereby produces a 90 degree phase shift in the current flow between said collector and emitter electrodes.

References Cited in the file of this patent

UNITED STATES PATENTS

| | | |
|---|---|---|
| 2,570,939 | Goodrich | Oct. 9, 1951 |
| 2,727,146 | Fromm | Dec. 13, 1955 |

OTHER REFERENCES

Article: "Oscillators" from page 1400 of the Proc. IRE for November 1952, vol. 40, No. 11.